(12) United States Patent
Brake et al.

(10) Patent No.: US 10,465,655 B2
(45) Date of Patent: Nov. 5, 2019

(54) WIND TURBINE WAKE STEERING APPARATUS

(71) Applicant: Inventus Holdings, LLC, Juno Beach, FL (US)

(72) Inventors: Daniel Brake, Hobe Sound, FL (US); Michael Anthony Scott, Palm Beach Gardens, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 611 days.

(21) Appl. No.: 15/201,964

(22) Filed: Jul. 5, 2016

(65) Prior Publication Data

US 2018/0010576 A1 Jan. 11, 2018

(51) Int. Cl.
*F03D 7/02* (2006.01)
*F03D 7/04* (2006.01)

(52) U.S. Cl.
CPC ........... *F03D 7/0204* (2013.01); *F03D 7/048* (2013.01); *F03D 7/047* (2013.01); *F05B 2230/80* (2013.01); *F05B 2270/321* (2013.01); *Y02E 10/723* (2013.01); *Y02P 70/523* (2015.11)

(58) Field of Classification Search
CPC . F03D 7/00; F03D 7/02; F03D 7/0204; F03D 7/0208; F03D 7/0212; F03D 7/0216; F03D 7/04; F03D 7/048
See application file for complete search history.

(56) References Cited

U.S. PATENT DOCUMENTS

| 7,299,627 | B2 | 11/2007 | Corten et al. | |
| 9,086,337 | B2 | 7/2015 | Merida et al. | |
| 9,201,410 | B2* | 12/2015 | Ambekar | G05B 13/04 |
| 9,512,820 | B2* | 12/2016 | Obrecht | F03D 7/0204 |
| 2006/0131889 | A1 | 6/2006 | Corten et al. | |
| 2010/0066087 | A1 | 3/2010 | Hayashi et al. | |
| 2011/0210549 | A1 | 9/2011 | Haag et al. | |

(Continued)

FOREIGN PATENT DOCUMENTS

GB 2484156 A * 4/2012 ........... F03D 7/0212

OTHER PUBLICATIONS

PCT International Prelininary Report on Patentability for International Application No. PCT/US2017/034000 dated Jan. 8, 2019.

*Primary Examiner* — Richard A Edgar
(74) *Attorney, Agent, or Firm* — Jeffrey N. Giunta; Fleit Intellectual Property Law

(57) ABSTRACT

Systems and methods enable yaw offsets on wind turbines in a wind farm. A wind turbine yaw controller receives a present wind direction signal from a local wind direction sensor and aligns the wind turbine in a substantially perpendicular direction based upon the present wind direction signal. A yaw controller is retrofitted between the wind direction sensor and the yaw controller to provide an adjusted wind direction signal to the yaw controller based upon the present wind direction signal and a yaw offset signal. An offset table relating yaw offsets with wind direction signal values may be stored locally at a wind turbine or at a site controller in communication with the wind tribune. Each wind turbine in the wind farm may be retrofitted with the yaw controller to enhance the power output of the wind farm by adjusting the wake effect between wind turbines of the wind farms.

27 Claims, 10 Drawing Sheets

(56) References Cited

U.S. PATENT DOCUMENTS

| | | |
|---|---|---|
| 2013/0099497 A1 | 4/2013 | Bowyer et al. |
| 2013/0255363 A1 | 10/2013 | Merida et al. |
| 2014/0037447 A1 | 2/2014 | Attia |
| 2014/0167415 A1 | 6/2014 | Mykhaylyshyn |
| 2014/0234103 A1 | 8/2014 | Obrecht |
| 2014/0348650 A1 | 11/2014 | Hansen |
| 2016/0215759 A1* | 7/2016 | Fleming .................. F03D 7/046 |

* cited by examiner

WIND TURBINE WAKE STEERING APPARATUS

FIELD OF THE DISCLOSURE

The present disclosure generally relates to controlling wind turbines, and more particularly to controlling wind turbines within a wind farm to increase overall wind farm efficiencies.

BACKGROUND

One technique for producing electrical energy from wind is to build a "wind farm" that consists of a number of wind turbines located at various fixed positions. In an example, each wind turbine has a rotor that is attached to multiple blades. These blades transform energy in the wind impinging on the blades into a rotational torque to drive an electrical generator and thus produce electricity. The rotor, electrical generator, and other components, are typically located within a housing, or nacelle, that is positioned on top of a tower or other vertical support. The rotor generally protrudes from this housing to allow the blades attached to the rotor to rotate as the wind impinges upon them.

In general, wind is able to arrive from any direction at a wind turbine. In order to effectively operate with wind arriving from different directions, the housing of the wind turbine is able to change the direction in which the rotor faces. The rotor is generally substantially perpendicular to a plane of the blades attached to that rotor. The direction of the rotor is referred to as "yaw." The yaw of a wind turbine and is generally expressed as an angle relative to some reference direction, such as north.

In an example, each wind turbine has a yaw controller that maintains the yaw of the wind turbine such that the rotor faces the direction of the presently observed wind, which is to say that the plane of the blades attached to the rotor is perpendicular to the present direction of the wind. In various examples, wind measurement equipment measure wind direction and speed at various locations around the wind farm. These wind measurements are provided to the yaw controller to allow the yaw controller to keep the wind turbine facing the oncoming wind.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods allow improving the operating efficiencies of multiple wind turbines that are located near one another, such as in a wind farm. In an example, an existing operational wind farm has a number of operational wind turbines are arranged in a geographical area. When operating, each of these existing wind turbines is positioned to face into the present direction of the wind at the particular wind turbine. As the blades of the wind turbine turn, each wind turbine creates a downwind wake that is a disturbance in the flow of wind behind that wind turbine. In the event that the wind is arriving from a direction that is along a line with multiple wind turbines, the wake from wind turbines towards the wind will adversely affect the operations of downwind wind turbines. This disturbance can cause a reduction in the electrical output of the downwind wind turbines.

Figure 1:
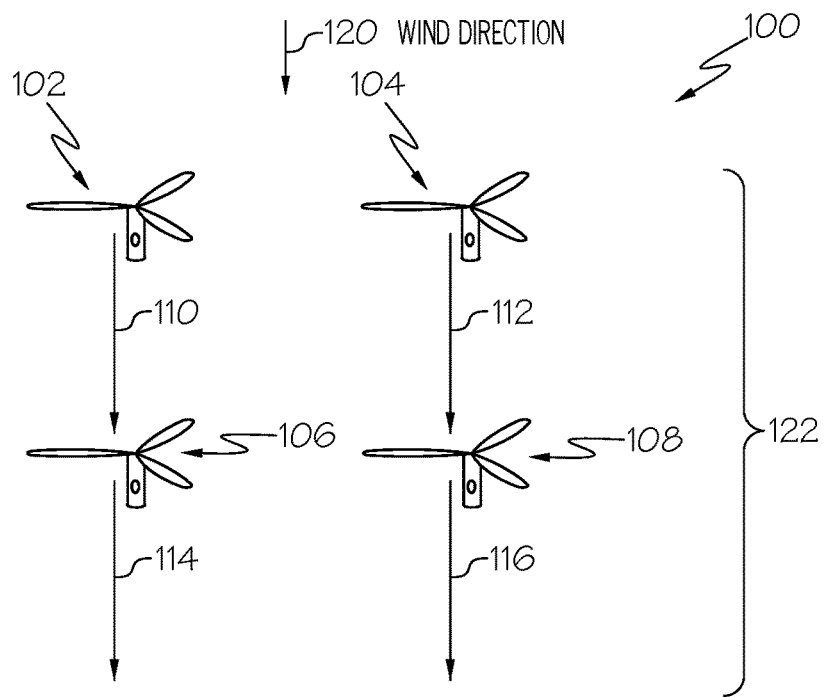
FIG. 1 illustrates an example wind farm operation, according to an example.

FIG. 1 illustrates an example wind farm operation 100, according to an example. The illustrated example wind farm operation 100 includes a group of wind turbines 122 that includes four wind turbines, a first wind turbine 102, a second wind turbine 104, a third wind turbine 106, and a forth wind turbine 108. The example wind farm operation 100 shows the present wind direction 120 with the wind coming from the top of the illustration. The wind turbines in the example wind farm operation 100 do not introduce a yaw offset to reduce the affect of wakes on downwind wind turbines.

The illustrated group of wind turbines 122 shows four wind turbines that are arranged in a square pattern in order to simplify the description of relevant aspects of the below described systems and methods. In general, a wind farm is able to have any number of wind turbines that are located in any arrangement relative to one another. The present wind direction 120 in this example is aligned with a line between the first wind turbine 102 and the third wind turbine 106, as well as with a line between the second wind turbine 104 and the fourth wind turbine 108, in order to better illustrate the effects of wake on downwind wind turbines.

Each wind turbine is shown to have a downstream wake. The first wind turbine 102 has a first wake 110, the second wind turbine 104 has a second wake 112, the third wind turbine 106 has a third wake 114, and the fourth wind turbine 108 has a fourth wake 116. Because the present wind direction 120 is along a line between the first wind turbine 102 and the third wind turbine 106, the first wake 110 from the first wind turbine hits the third wind turbine 106. The power output of the third wind turbine 106 is reduced because of the wind disturbance at the third wind turbine caused by the first wake 110. The electrical output of the fourth wind turbine 108 is similarly reduced due to the second wake 112 from the second wind turbine 104. The third wake 114 and the fourth wake 116 will further affect other wind turbines (not shown) that may be in those wake streams. The effect that a wake has on a downstream wind turbine is related to the present direction of wind in relation to the arrangement of the wind turbines in the group of wind turbines 122.

Figure 2:
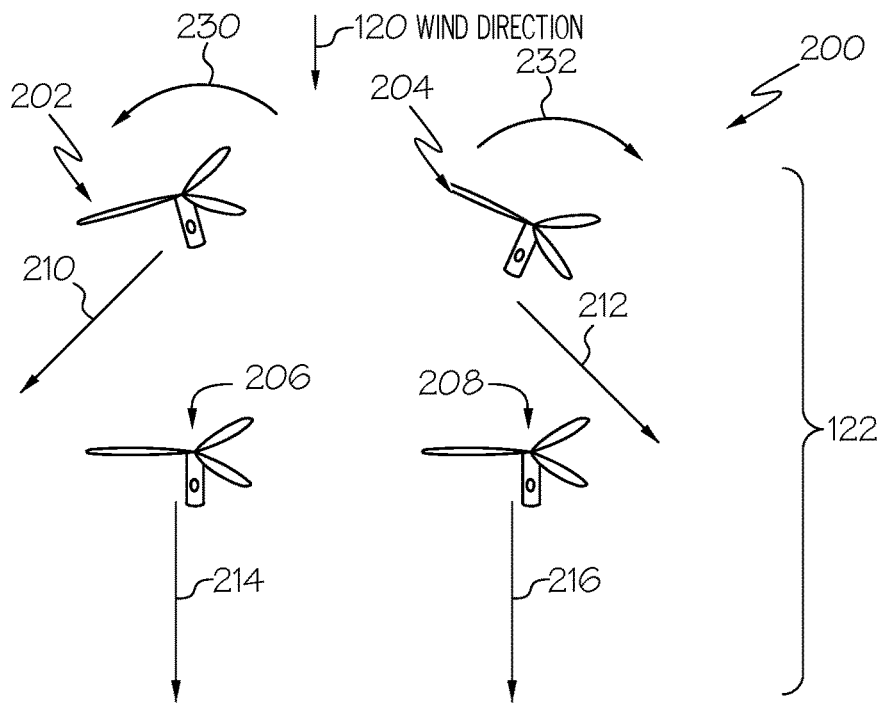
FIG. 2 illustrates a yaw corrected wind farm operation according to an example.

FIG. 2 illustrates a yaw corrected wind farm operation 200 according to an example. The illustrated yaw corrected wind farm operation 200 includes a retrofitted group of wind turbines 222. The retrofitted group of wind turbines 222 contains the same turbines that are in the group of wind turbines 122 discussed above except that these wind turbines have been retrofitted with a yaw adjustment processor as is described in further detail below. In this example, the yaw adjustment processors that have been retrofitted into each wind turbine in the retrofitted group of wind turbines 222 operates to adjust the yaw angle of each wind turbine to reduce the effect that the wake of that wind turbine has on downstream wind turbines.

The yaw corrected wind farm operation 200 depicts a first retrofitted wind turbine 202, which is the first wind turbine 102 discussed above that has been retrofitted with a yaw adjustment processor. A second retrofitted wind turbine 204, a third retrofitted wind turbine 206, and a fourth retrofitted wind turbine 208 are each similarly the corresponding wind turbine described above that has been retrofitted with its own yaw adjustment processor.

In the illustrated yaw corrected wind farm operation 200, the present wind direction 120 is the same as in the example wind farm operation 100, and is along the line between the first retrofitted wind turbine 202 and the third retrofitted wind turbine 206. The wind is also along the line between the second retrofitted wind turbine 204 and the fourth retrofitted wind turbine 208. Unlike in the example wind farm operation 100, some wind turbines in the yaw corrected wind farm operation 200 have their yaw adjusted to reduce the effect of their wakes on wind turbines that are downwind from them.

In the illustrated example, the first retrofitted wind turbine 202 has a first yaw offset 230 relative to the oncoming present wind direction 120. This first yaw offset 230 causes the first retrofitted wind turbine 202 to be rotated counter-clockwise from the wind direction 120 and causes the first adjusted wake 210 produced by the first retrofitted wind turbine to be steered away from the third retrofitted wind turbine 206. Because the first adjusted wake 210 is steered away from the third retrofitted wind turbine 206, the third retrofitted wind turbine 206 receives wind with reduced disruption by the wake generated by an upstream wind turbine, such as the first retrofitted wind turbine 202. The third retrofitted wind turbine 206 is thus able to produce more electrical power in this example because it is receiving the wind without disturbance.

In order to steer the first adjusted wake 210 away from the third retrofitted wind turbine 306, the first retrofitted wind turbine 202 is not squarely facing the wind due to the first yaw offset 230, and thus may not produce as much electricity as it would without the first yaw offset 230. Although the first retrofitted wind turbine 202 may not be producing as much electrical power as it could without the first yaw offset 230, the third retrofitted wind turbine 206 is producing more electricity because it is less affected by wake from the first retrofitted wind turbine 202. In many examples, this results in a greater net amount of electricity generation.

The second retrofitted wind turbine 204 has a second yaw offset 232 to steer the second adjusted wake 212 away from the fourth retrofitted wind turbine 208. In this illustrated example, the second retrofitted wind turbine 204 is rotated clockwise from the wind direction 120. In general, different wind turbines in a wind farm are able to be controlled to have different yaw offset values even given the same relative wind direction. Such differences are able to account for various characteristics of the wind farm. As discussed above, the applied second yaw offset 232 causes the second retrofitted wind turbine 204 to produce less electricity. Because the second adjusted wake 212 is steered away from the fourth retrofitted wind turbine 208, the fourth retrofitted wind turbine 208 produces more electricity. In an example, the increase in the electrical power produced by the fourth retrofitted wind turbine 208 is greater than the reduction in electrical power produced by the second retrofitted wind turbine 204 due to the second yaw offset 232.

The illustrated yaw adjusted wind farm operation 200 depicts that the third retrofitted wind turbine 206 and the fourth retrofitted wind turbine 208 do not have a yaw angle offset. This is due to the simplified depiction of a wind farm with only four wind turbines. Because the third retrofitted wind turbine 206 and the fourth retrofitted wind turbine 208 have no downwind wind turbines, there is no yaw adjustment needed for these wind turbines. In general, all wind turbines, with a possible exception of the most downwind wind turbines, in a wind farm are able to have a yaw angle offset in order to steer their wakes away from downwind wind turbines.

Figure 3:
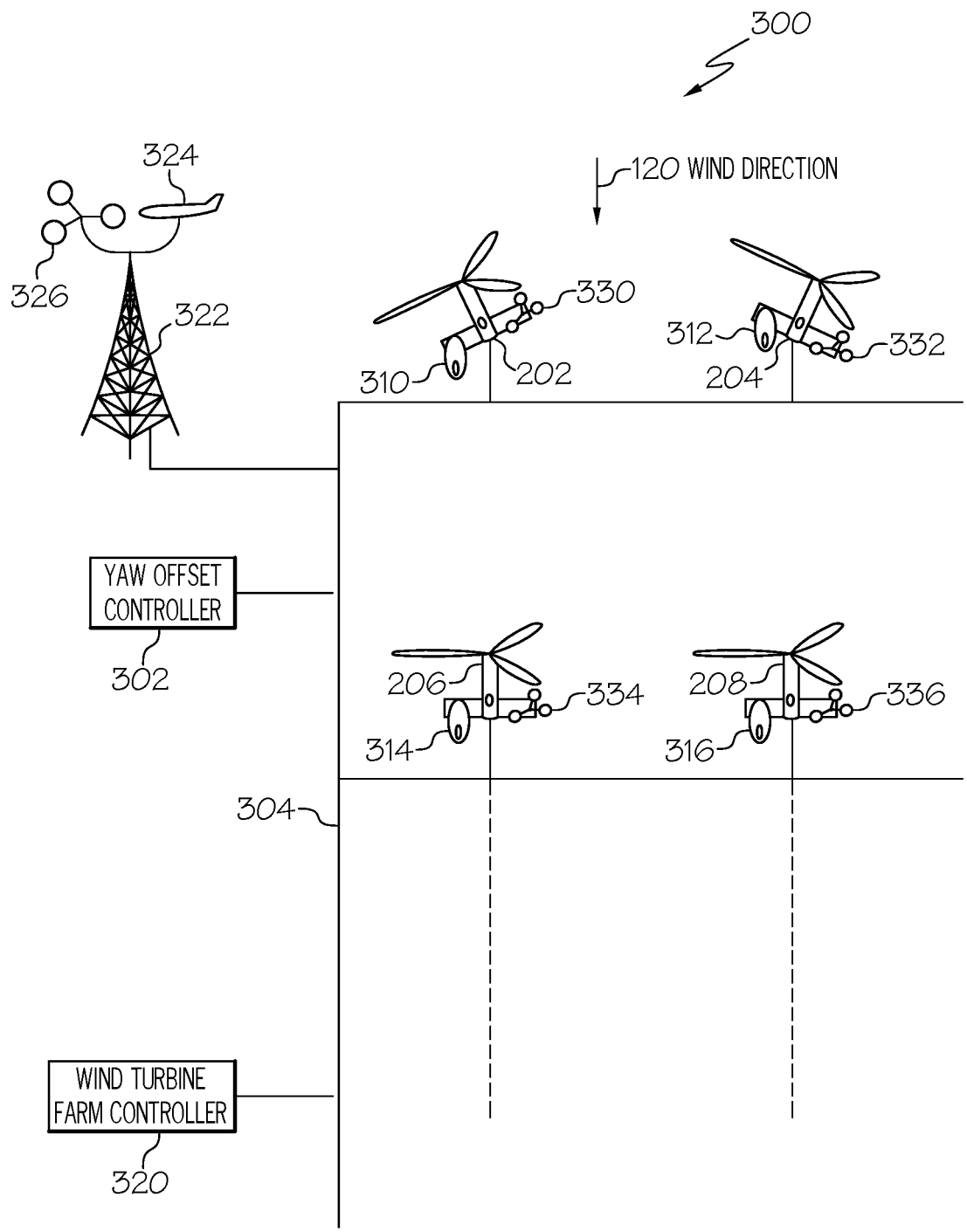
FIG. 3 illustrates a wind turbine data network, according to an example.

FIG. 3 illustrates a wind turbine data network 300, according to an example. The wind turbine data network 300 is an example of a data network that allows data communications between various controllers for a wind farm and equipment in each wind turbine in a wind farm. The wind turbine data network 300 depicts a data communications channel 304 that performs communications for this network. The data communications channel 304 is used in an example to exchange data between and among a wind turbine farm controller 320, a yaw offset controller 302, and the four retrofitted wind turbines described above with regards to the yaw adjusted wind farm operation 200. These four retrofitted wind turbines include the first retrofitted wind turbine 202, the second retrofitted wind turbine 204, the third retrofitted wind turbine 206, and the fourth retrofitted wind turbine 208. The wind turbine data network 300 depicts the position of these four retrofitted wind turbines in the configuration described above with regards to the yaw adjusted wind farm operation 200.

Each wind turbine has an associated wind vane that is located in proximity to that wind turbine. The first retrofitted wind turbine 202 has a first wind vane 310, the second retrofitted wind turbine 204 has a second wind vane 312, the third retrofitted wind turbine 206 has a third wind vane 314, and the fourth retrofitted wind turbine 208 has a fourth wind vane 316. In various examples, these wind vanes are able to be located at any suitable position on or near its associated wind turbine. In other examples, any type of wind direction sensor is also able to be used to determine the present wind direction in the vicinity of each wind turbine. As described below, a controller within each wind turbine receives an indication of the present direction of wind from its associated wind vane and steers the wind turbine to face into that present direction of wind. In some examples, the wind direction indications from each wind vane are also able to be communicated via the data communications channel 304 to other devices, such as to other wind turbine controllers, to the wind turbine farm controller 320, to the yaw offset controller 302, or to combinations of these. The yaw offset controller 302 may comprise one or more of a Programmable Logic Controller (PLC), a Digital Signal Processing (DSP) computer, microcontroller and/or another signal processor, or combinations of these that are able to implement the functions associated with the offset controller and may be incorporated within the wind turbine farm controller 320.

Each wind turbine in this example has an associated anemometer that is located in proximity to that wind turbine. The first retrofitted wind turbine 202 has a first anemometer 330, the second retrofitted wind turbine 204 has a second anemometer 332, the third retrofitted wind turbine 206 has a third anemometer 334, and the fourth retrofitted wind turbine 208 has a fourth anemometer 336. In various examples, these anemometers or other wind speed measurement devices are able to be located at any suitable position on or near its associated wind turbine. In other examples, any type of wind speed sensor is also able to be used to determine the present wind speed in the vicinity of each wind turbine. As described below, one or more controllers within each wind turbine receive an indication of the present wind speed from its associated anemometer and perform various operations to control the wind turbine. In an example, a yaw offset angle is determined in part based on present wind speeds in the vicinity of the wind turbine. In some examples, wind speed indications from each anemometer are also able to be communicated via the data communications channel 304 to other devices, such as to other wind turbine controllers, to the wind turbine farm controller 320, to the yaw offset controller 302, or to combinations of these. Data channel 304 may include one or more of any wired or wireless data communications paths, or combination thereof, having a capability to facilitate the communications described herein.

Controllers in each wind turbine are also able to communicate data via the data communications channel 304 with other wind turbines, the wind turbine farm controller 320, the yaw offset controller 302, or with combinations of these. In general, the wind turbine farm controller 320 performs a number of conventional wind farm control functions to manage and control the operation of each wind turbine in the wind farm. The wind turbine farm controller 320 communicates with each wind turbine in the group of wind turbines 122 to receive information measured or calculated by a particular wind turbine, and also to send control or other management information to a particular wind turbine.

The yaw offset controller 302 in an example receives indications of the present direction of wind and the present wind speed at each wind turbine within the retrofitted group of wind turbines 222. These indications of present wind speed and present direction of wind at each wind turbine in an example are communicated via the data communications channel 304 and are determined by the wind vane and anemometer that is local to each wind turbine.

The yaw offset controller 302 in one example determines a yaw offset for each wind turbine in the retrofitted group of wind turbines 222 based on the received indications of the present wind speed and present direction of wind at each wind turbine, as well as the physical location of each wind turbine relative to other wind turbines within the retrofitted group of wind turbines 222. In some examples, the yaw offset controller 302 is able to determine yaw offsets for each wind turbine based on any suitable set of data, such as any combination of wind speed or wind direction near any wind turbines within the retrofitted group of wind turbines 222, particularly neighboring wind turbines. In some examples, the yaw offset controller 302 is able to determine yaw offset values for various wind turbines based on predicted wind conditions at those wind turbines. In another example the yaw offset values may be dynamically determined in real time in order to increase the electrical power generated by the wind farm.

In an example, an operational wind farm that does not adjust the yaw of wind turbines to steer wake away from downwind wind turbines is able to be retrofitted with equipment to perform yaw adjustments. With reference to the example wind farm operations 100, the wind turbines within the wind farm group of wind turbines 122 are able to be retrofitted with yaw control processors and a yaw offset controller 302 is able to be connected to the data communications channel 304 that is already present in that wind farm. Retrofitting an existing operational wind farm to include equipment to perform yaw adjustments to reduce the impact of wakes from upwind wind turbines allows the efficiency and electrical output of that wind farm to be economically improved with minimal impact to the equipment and operations of the wind farm. Thus, the power output of an existing operational wind farm may be increased by the retrofitting of the wake offset features described herein with minimal modification.

The wind turbine data network 300 further includes a meteorological tower (referred to as a "met tower") that includes a meteorological tower wind vane 324 and a metrological tower anemometer 326. The meteorological tower wind vane 324 and the metrological tower anemometer 326 are present in some examples and are able to send data indicating the present direction of wind and the present wind speed, respectively, to any suitable destination via the data communications channel 304. For example, data indicating present wind speed and direction is able to be received by any device connected to the data communications channel 304. In various examples, controllers within any wind turbine within the group of wind turbines 122, the wind turbine farm controller 320, the yaw offset controller 302, or any combination of these are able to receive the present direction of wind and present wind speed indications that are determined and sent by the meteorological tower wind vane 324 and a metrological tower anemometer 326.

That data is able to be used for any purpose, such as determining yaw offsets for particular wind turbines.

Figure 4:
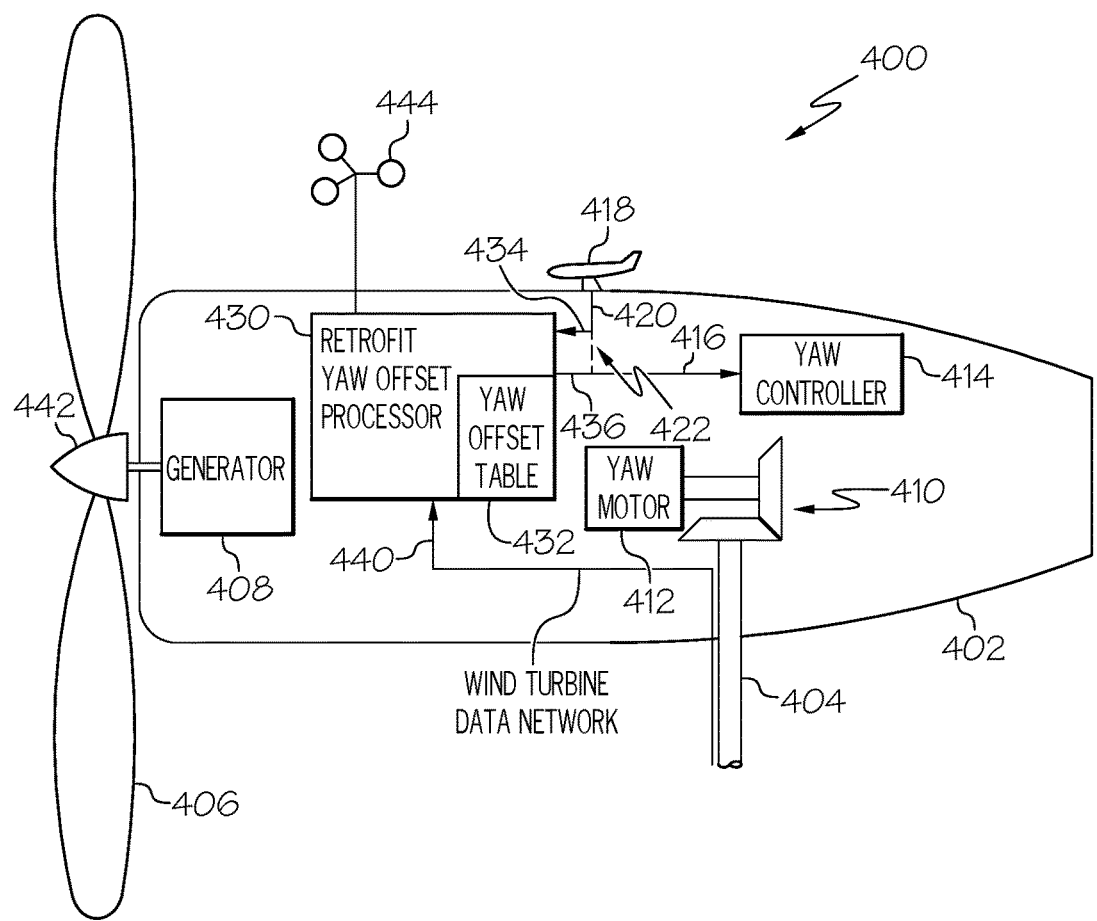
FIG. 4 illustrates a retrofitted wind turbine, according to an example.

FIG. 4 illustrates a retrofitted wind turbine 400, according to an example. The retrofitted wind turbine 400 illustrates a schematic view of a wind turbine nacelle and associated components of a wind turbine that has been retrofitted with a retrofit yaw offset processor 430. The retrofitted wind turbine 400 is an example of one of the wind turbines in the retrofitted group of wind turbines 222 discussed above. In further examples, a similar wind turbine is able to be manufactured with a processor performing the functions of the retrofit yaw offset processor 430 where that processor may be one or more separate processors or one or more processors that also perform other functions.

The retrofitted wind turbine 400 shows a wind turbine nacelle 402 that has a generator 408 with a shaft 442 to which blades 406 are attached. Wind blowing on the blades 406 causes the shaft 442 and generator 408 to turn, and thereby generate electricity. In general, a retrofitted wind turbine 400 has one or more controllers (not shown) that control the pitch of the blades and operating parameters of the generator 408 to adapt operations to various present wind speeds and conditions. Such controllers are not shown herein in order to simplify the description of relevant aspects of this example.

A yaw motor 412 is coupled to the support 404 through a yaw motor gearbox 410 to allow the nacelle 402 to be rotated around its vertical axis. By rotating the nacelle around a vertical axis, the direction in which the blades 406 are pointed can be changed to accommodate changes in the present direction of the wind. A yaw controller 414 receives information such as the present direction of wind at the retrofitted wind turbine 400 and controls the yaw motor 412 to rotate the nacelle 402 to maintain the direction of the shaft 442 to face into the wind to attempt to maximize the wind power transferred to the generator.

The retrofitted wind turbine 400 includes a wind vane 418 that determines a present direction of wind. The wind vane 418 is an example of a wind direction sensor that is local to the wind turbine in which the retrofit yaw offset processor 430 is installed. In further examples, any suitable wind direction sensor may be used. The wind vane 418 has a present direction of wind interface 420 that outputs a present wind direction signal that indicates the present direction of wind local to wind turbine. Prior to retrofitting the wind turbine, the present direction of wind interface 420 is normally connected to a yaw control input of the wind turbine, such as a wind direction input 416 of the yaw controller 414. In an example, the yaw control input of the wind turbine, when receiving the present wind direction signal in an absence of a yaw offset signal, causes a yaw controller to align the wind turbine with the present direction of wind.

The illustrated retrofitted wind turbine 400 also includes an anemometer 444 that measures wind speed in the vicinity of the retrofitted wind turbine 400. The anemometer 444 in an example provides wind speed indications to various devices. Wind speed indicators in some examples are provided to controllers (not shown) in the retrofitted wind turbine 400, such as controllers that vary the pitch of the blades 406, control various operating parameters of the generator 408. Wind speed indicators in some examples are further provided to the data communications channel 304, described above, to distribute wind speed information measured at each wind turbine to various locations, such as the wind turbine farm controller 320, the yaw offset controller 302, controllers in one or more neighboring wind turbines, other destinations, or combinations of these.

The retrofitted wind turbine 400 in this example has been retrofitted with a retrofit yaw offset processor 430. The retrofit yaw offset processor 430 is able to be retrofitted into an operational wind turbine by placing it into an electrical circuit connecting the present direction of wind interface 420 of the wind vane 418 to the wind direction input 416 of the yaw controller 414. In an example, the installation of the retrofit yaw offset processor 430 includes disconnecting the present direction of wind interface 420 from the wind direction input 416 of the yaw controller 414 and connecting the present direction of wind interface 420 to a present direction of wind input 434 of the retrofit yaw offset processor 430. An adjusted wind direction signal output 436 of the retrofit yaw offset processor 430 is then connected to the wind direction input 416 of the yaw controller 414. The direct insertion of the retrofit yaw offset processor 430 into the signal connection between the wind vane 418 and yaw controller 414 allows the efficient retrofitting of any suitable wind turbine. In an example, a wind turbine that is operational without the retrofit yaw offset processor 430 is able to be retrofitted to incorporate a retrofit yaw offset processor 430 after that wind turbine is made operational.

The retrofit yaw offset processor 430 in an example receives a present wind direction signal that indicates a present direction of wind that is local to the retrofitted wind turbine 400 and that is normally provided to the yaw controller 414 prior to the retrofit. The retrofit yaw offset processor 430 in an example creates an adjusted wind direction signal by adding a yaw offset value to the present direction of the wind determined in the vicinity of this wind turbine. The adjusted wind direction signal, which is the sum of the present direction of wind and the yaw offset value in an example, is then provided to the wind direction input 416 of the yaw controller 414. The wind direction input 416 of the yaw controller 414 is an example of a yaw control input of the wind turbine. In this example, the yaw control input of the wind turbine, when receiving the present wind direction signal 420 from the wind vane 418 in the absence of the yaw offset signal, causes the yaw controller 414 to align the wind turbine with the present direction of wind.

Incorporating the retrofit yaw offset processor 430 into the wind turbine in this manner and providing the adjusted wind direction signal to the wind direction input of the yaw controller allows the yaw controller 414 to steer the nacelle in a direction that is based on the sum of the present direction of wind and the yaw offset value rather than just based on the present direction of wind as is the conventional operation of a wind turbine control system. Such operation of the retrofit yaw offset processor 430 allows an existing wind turbine with a yaw controller 414 that is designed to align the wind turbine with the present direction of wind to be enhanced to allow selectable yaw offsets to be applied to the wind turbine pointing direction to, for example, steer the wake of the wind turbine in a desired direction that is different from directly downwind of the wind turbine.

In some examples, the retrofit yaw offset processor 430 also receives wind speed measurements from the anemometer 444 to support determinations of yaw offsets to be applied for the wind turbine. In general, the wind vane 418 and anemometer 444 are present in conventional wind turbines prior to the retrofitting operation of installing the retrofit yaw offset processor 430. The yaw offset processor 430 is also connected to the wind turbine data network 440 through a connection to, for example, the above described data communications channel 304. In other examples, the yaw controller may apply averaging, smoothing other integration type functions, other statistical processing, or combinations of these, to the wind speed and direction data. In an example, the retrofit yaw offset processor 430 may include complementary processes to the adjusted wind direction signal to facilitate the overall operation of the wind farm.

Yaw offset values to be added to the present direction of wind are able to be obtained by any suitable technique. As the wind turbine operates, a sequence of yaw offset values are determined and added to the present direction of wind. In an example, this sequence of yaw offset values is referred to as a yaw offset signal. In an example, a remote data source, such as the yaw offset controller 302 described above, provides the yaw offset signal by sending a sequence of yaw offset values making up the yaw offset signal to each wind turbine over the data communications channel 304. The retrofit yaw offset processor 430 determines the yaw offset signal by receiving this sequence of yaw offset values via the wind turbine network. The retrofit yaw offset processor 430 then adds the yaw offset signal to the present direction of wind signal 420 to provide an adjusted wind direction signal to the present wind direction input of the yaw controller 414. In an example, the retrofit yaw offset processor 430 sends a present direction of wind signal received from the wind vane 418 to the remote data source, such as the yaw offset controller 302, to support determination of the yaw offset signal at that remote data source.

In alternative examples, rather than receive a yaw offset signal from a remote data source such as the yaw offset controller 302, the retrofit yaw offset processor 430 is able to determine yaw offset values locally based on at least the present wind direction signal. The retrofit yaw offset processor 430 in the illustrated example includes a yaw offset table 432. An example if a yaw offset table 432 is described in further detail below. The yaw offset table 432 is an integral yaw offset table that in an example has a number of yaw offset values with each yaw offset value being associated with at least a different wind direction value of wind local to the wind turbine. In one example, the retrofit yaw offset processor 430 receives indications of the present direction of wind from the wind vane 418 and an indication of the present wind speed from the anemometer 444. These indications of the present direction of wind and present wind speed are used as an index into the yaw offset table 432 to look up a yaw offset value that is to be applied at this time to this wind turbine. The retrofitted yaw offset processor 430 in this example determines the yaw offset signal based on yaw offset values that are stored in the yaw offset table 432 in association with a present wind direction indicated by the wind direction signal such as is received from the wind vane 418.

The values in the yaw offset tables are able to be provided by any suitable technique. In an example, values for the yaw offset table 432 are determined by and received from the yaw offset controller 302 via the wind turbine data network 440 via a connection to the data communications channel 304. In further examples, these values are able to be programmed into the yaw offset table 432 by any suitable technique thereby allowing the values in the yaw offset table 432 to be determined prior to retrofitting. When these values are determined prior to retrofitting, the retrofitted equipment may not need to use the use of the data communications channel 304 and thus retrofitting this capability into an existing wind farm would not need to modify or install data communications equipment to support the operation of the retrofitted yaw offset equipment. Furthermore, updates to the yaw offset table 432 are able to be manually installed at each wind turbine. In alternative examples, an alternative retrofit yaw offset processor may not include or use a yaw offset table. In one such example, the alternative yaw offset processor may calculate a sequence of yaw offset values at various times by applying an algorithm based on present wind conditions to determine the yaw offset signal. This yaw offset signal is then added to the indication of the present direction of wind determined by the wind vane 418 and received via the present direction of wind interface 420.

The retrofit yaw offset processor 430 is also able to determine the yaw offset signal based on wind conditions at locations removed from the wind turbine in which the retrofit yaw offset processor 430 is installed. In an example, the retrofit yaw offset processor 430 is able to receive a second present wind direction signal (and optionally wind speed) from a remote wind direction sensor operating within a vicinity of the wind turbine in which the retrofit yaw offset processor 430 is installed. In an example, the second present wind direction signal is able to be received via the wind turbine data network 440 and communicated via the data communications channel 304. In such an example, the adjusted wind direction signal is further based on that second wind direction signal (and optionally wind speed). In some examples that use a yaw offset table 432, the yaw offset values stored in the yaw offset table 432 are associated with both a respective wind direction value at the wind turbine in which the retrofit yaw offset processor is installed and also a value of wind direction reported by the remote wind direction sensor. In an example, the remote wind direction sensor is local to a second wind turbine within a wind farm system and that is operating within a vicinity of the wind turbine in which the retrofit yaw offset processor 430 is installed. The wind turbine in which the retrofit yaw offset processor 430 is installed is also part of that wind farm system. This remote wind direction sensor is able to be a wind vane located at that second wind turbine in an example. In a further example, the remote wind direction sensor is able to be local to a meteorological tower operating within the vicinity of the wind turbine. In other examples, a multiplicity of wind direction (and optionally wind speed) signals may be received from a multiplicity of sites in within the vicinity and processed at the wind turbine in order to determine the yaw offset signal associated with the wind turbine.

Figure 5:
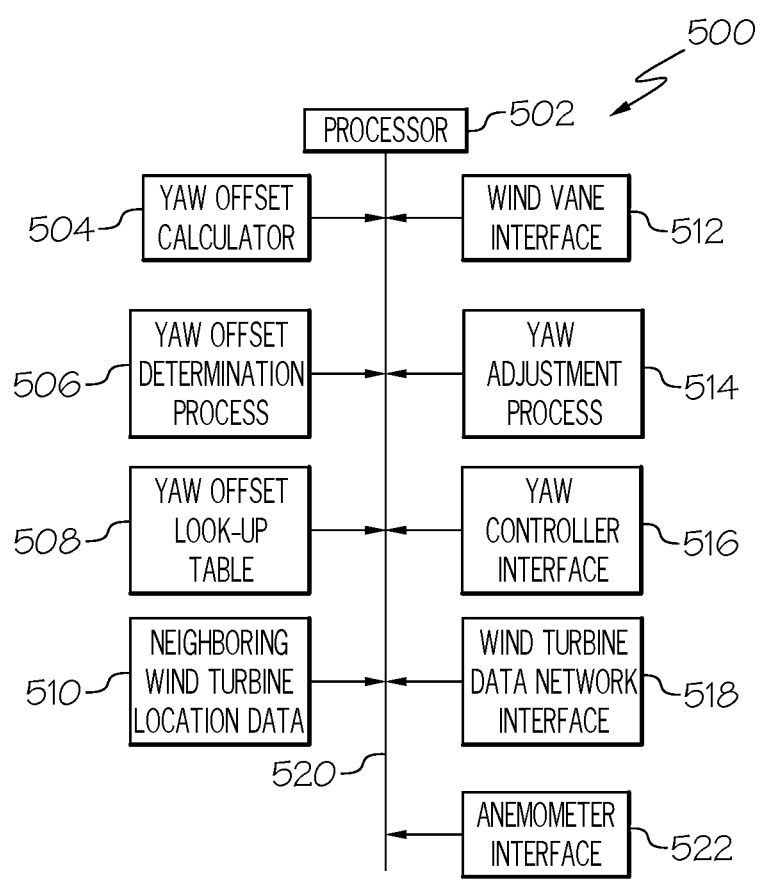
FIG. 5 illustrates a retrofit yaw control processor block diagram, according to an example.

FIG. 5 illustrates a retrofit yaw control processor block diagram 500, according to an example. The retrofit yaw control processor block diagram 500 represents an example block diagram of components within a retrofit yaw processor 430 discussed above. In general, a retrofit yaw processor 430 is able to be realized with any suitable design or configuration. The components depicted in the retrofit yaw control processor block diagram 500 in an example are able to be contained within a retrofit module that is able to be incorporated into an operational wind turbine. In further examples, the components depicted in the retrofit yaw control processor block diagram 500 in an example are able to be incorporated into a yaw controller of a wind turbine, such as the above described yaw controller 414, or in other components local to the wind turbine.

The retrofit yaw control processor block diagram 500 includes a processor 502. The processor 502 is able to perform processing based on programmable code that define suitable processes and that is stored in suitable structures that are able to be accessed by the processor 502. The processor 502 is further able to perform data processing by accessing and manipulating stored data as well as any one or combination of receiving, manipulating, creating, or otherwise determining, data to be provided as an output. The illustrated processor 502 communicates with a number of other components in the retrofit yaw control processor block diagram 500 via a data bus 520.

The retrofit yaw control processor block diagram 500 includes various external data interfaces to allow the processor 502 to receive data from and provide data to other devices. A wind vane interface 512 is an example of a present direction of wind input 434 of the retrofit yaw offset processor 430, which is described above. The wind vane interface 512 in an example receives a present wind direction signal indicating a present direction of wind local to the wind turbine. An anemometer interface 522 in an example receives wind speed indications from an anemometer 444. A yaw controller interface 516 is an example of an adjusted wind direction signal output 436 of the retrofit yaw processor 430, which is described above. The yaw controller interface 516 provides an adjusted wind direction signal to the yaw control input of the wind turbine. A wind turbine data network interface 518 is an interface to the wind turbine data network 440 and connects to the data communications channel 304 in an example.

The retrofit yaw control processor block diagram 500 includes a yaw offset look-up table 508. The yaw offset look-up table is an example of the above described yaw offset table 432. In an example, the yaw offset look-up table 508 stores yaw offset values in association with various values of wind conditions, such as wind direction and wind speed local to this wind turbine, and in some examples also at remote locations. The values stored in the yaw offset look-up table 508 are able to be obtained from any suitable source. In some examples, values in the yaw offset looks-up table 508 are able to be received from a remote source, such as the yaw offset controller 302 discussed above. In another example, as described in further detail below, the processor 502 is able to determine values to be stored in the yaw offset look-up table 508.

The processor 502 performs various functions by executing program code stored in a suitable structure that defines various processes. A yaw offset calculator 504 is a process defined by program code executed by processor 502 that determines a yaw offset value to be applied to this wind turbine based on, for example, present wind conditions. In an example, the yaw offset calculator 504 is able to receive present wind condition indications and use those indications as indices into the yaw offset look-up table 508. These wind condition indices in an example are able to be received from, for example, the wind vane interface 512 and the anemometer interface 522. The yaw offset calculator 504 provides this yaw offset value as a yaw offset signal.

The yaw adjustment process 514 determines an adjusted wind direction signal based on the output of the yaw offset signal provided by the yaw offset calculator 504 and the present wind direction as received from the wind vane interface 512. In an example the yaw adjustment process 514 calculates an adjusted wind direction signal that is the sum of the present wind direction, as received in an indicator from the wind vane interface 512, and the yaw offset signal that is provided by the yaw offset calculator 504. This adjusted wind direction signal is then provided to the yaw control input via the yaw controller interface 516. As described above, the yaw controller interface 516 of the retrofit yaw offset processor 430 provides this adjusted wind direction signal to the wind direction input 416 of the yaw controller 414.

In some examples, the retrofit yaw offset processor 430 determines yaw offset values based upon data stored in the yaw offset look-up table, where that data was received from a remote data source via the wind turbine data network interface 518. In further examples, the processor 502 of the retrofit yaw offset processor 430 is able to calculate yaw offset values locally and use those values to create yaw offset signals to be added to the present wind direction to produce an adjusted wind direction. In one such example, a yaw offset determination process 506 consists of program code executed by the processor 502 to determine yaw offset values to be applied at a particular wind turbine based on present wind conditions such as present wind speed and direction and, in some examples, other information such as remote wind conditions. In an example, a neighboring wind turbine location data set 510 stores physical location data for wind turbines that are neighbors of the wind turbine in which this retrofit yaw offset processor 430 is installed, which is referred to herein as the local wind turbine. The yaw offset determination process 506 accesses the neighboring wind turbine location data set 510 and applies a suitable algorithm to determine yaw offsets to apply to the local wind turbine. In various examples, yaw offset values for different values of wind conditions can be determined and stored in the yaw offset look-up table 508. In further examples, the yaw offset determination process is able to operate in conjunction with the yaw offset calculator 504 to determine yaw offset values based on receiving present wind condition indicators, such as indicators for the present wind direction and present wind speed. In an example, the yaw offset determination process 506 determines a yaw offset value each time an indicator of the present wind direction or the present wind speed is received.

Figure 6:
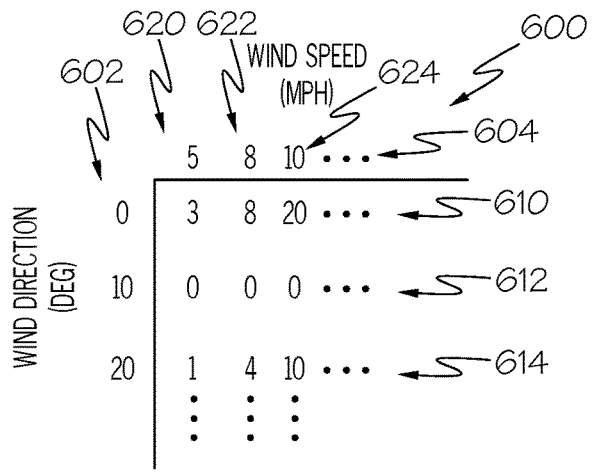
FIG. 6 illustrates a yaw offset table contents, according to an example.

FIG. 6 illustrates a yaw offset table contents 600, according to an example. The yaw offset table contents 600 is an example of data stored in a yaw offset table 432 or yaw offset look-up table 508 discussed above. The illustrated yaw offset table contents 600 depicts yaw offset values that correspond to, and that are indexed by, the present wind speed and the present direction of wind at the wind turbine. In further examples, values stored in alternative yaw offset tables are able to correspond to and be indexed by any suitable criteria, such as only the present direction of wind at the wind turbine, combinations of wind conditions at the local wind turbine and at other wind turbines in a wind farm, other conditions, or combinations of these.

The yaw offset table contents 600 illustrates values stored within a portion of an entire yaw offset table. The illustrated portion is representative of the values stored in an entire yaw offset table. This representative portion is illustrated and described here in order to simplify and more clearly describe relevant aspects of this example.

The stored yaw offset values in this example are organized into a two-dimensional table. The columns of the table store yaw offset values for different values of present wind speeds. The rows store yaw offset values for different present directions of wind. A row index 602 shows three wind direction values, in degrees (DEG) relative to North, of 0, 10, and 20. Ellipses beneath these values indicate that these values continue, up through 350 degrees in this example. A column index 604 shows three wind speed values, in miles per hour (MPH), of 5, 8, and 10. Ellipses beyond these values indicate that these values continue up through the maximum operating wind speed for the wind turbine in this example.

The yaw offset table contents 600 has a first row 610 that stores yaw offset values associated with a wind direction of 0 degrees. A second row 612 stores yaw offset values associated with a wind direction of 10 degrees and a third row 614 stores yaw offset values associated with a wind direction of 20 degrees. Values stored in a first column 620 are associated with a wind speed of 5 MPH, values stored in a second column 622 are associated with a wind speed of 8 MPH, and values stored in a third column 624 are associated with a wind speed of 10 MPH. A yaw offset value for a present wind direction and speed that corresponds to any of these values is able to be directly retrieved from this yaw offset table.

When the present wind direction signal indicates a present wind direction between two values stored in the row index 602, a suitable technique is used to determine the yaw offset value to use. In various examples, the closest wind direction value stored in the row index is selected. In another example, a yaw offset value is able to be interpolated by any suitable technique between the yaw offset values that are stored for those two wind directions in the row index 602. For example, a present direction of wind value of 7.5 degrees with a wind speed of 8 MPH may cause either the yaw offset value associated with a wind direction of 10 degrees (which is stored in the yaw offset table contents 600) to be selected, or an interpolation of the yaw offset values associated with 0 and 10 degrees could be calculated. In such an example, a linear interpolation of those values for a wind speed of 8 MPH is a yaw offset value of 2. Other interpolation techniques can also be used.

In one example, the values stored in the yaw offset table are determined by a computerized simulation of the operation of an existing wind farm to evaluate the effect of different yaw offset values, as would be introduced by retrofitting yaw offset capabilities, in enhancing the power output of the existing windfarm in the presence of various wind directions. In another example, the values stored in the yaw offset table may be further enhanced by refinements to the values stored in the yaw offset table that are made by measuring and evaluating wind farm power output based upon adjustments to the values stored in yaw offset tables that are initially derived based on the computerized simulations or other approaches. The yaw offset table for one wind turbine may have values different from the yaw offset table of another wind turbine in the wind farm based upon any of a number of factors, some of which may include topography of the wind farm and location of a wind turbine within the wind farm.

Figure 7:
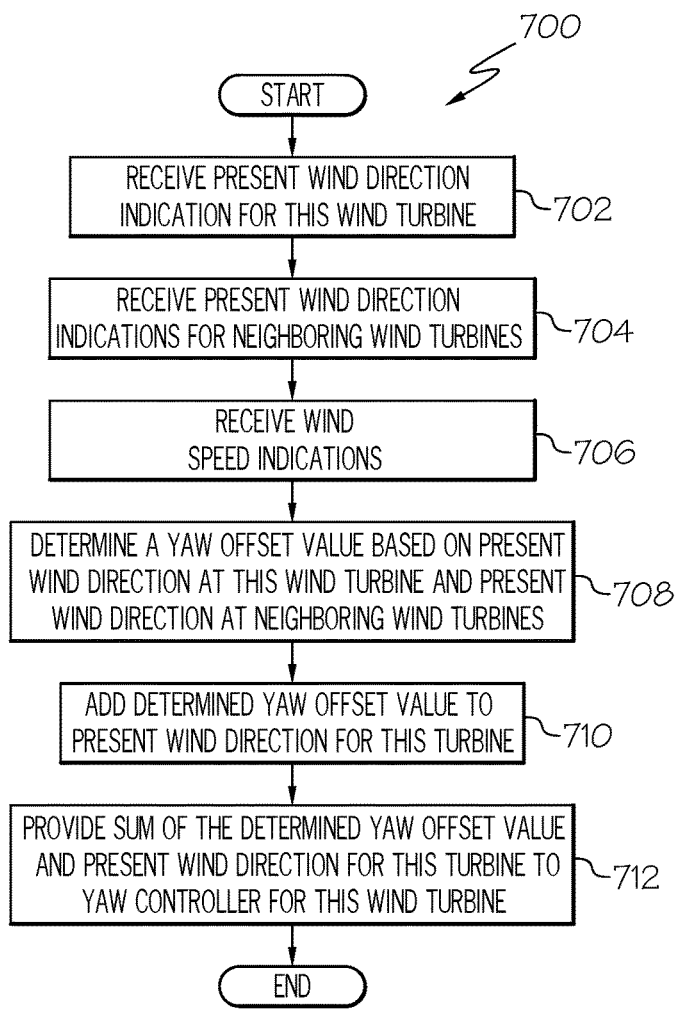
FIG. 7 illustrates a retrofit yaw offset process, according to an example.

FIG. 7 illustrates a retrofit yaw offset process 700, according to an example. The retrofit yaw offset process 700 is an example of a process performed by the retrofit yaw offset processor 430 described above. The following description refers components discussed above with regards to the retrofitted wind turbine 400.

The retrofit yaw offset process 700 beings by receiving, at 702, a present wind direction indication for this wind turbine. In an example, a present wind direction indication for this turbine is able to be received from the wind vane 418. In other examples, a present wind direction indication is able to be obtained by any suitable technique.

In some examples, the retrofit yaw offset process 700 receives, at 704, present wind direction indicators from neighboring wind turbines. In an example, these wind direction indicators are received by the retrofit yaw offset processor 430 through the wind turbine data network 440. In some examples, the retrofit yaw offset processor 430 determines a yaw offset value to use for a wind turbine based on only the present wind direction at that wind turbine. In further examples, the retrofit yaw offset processor 430 is able to determine a yaw offset value to use for a wind turbine based on one or more combinations of the present wind direction at that wind turbine and the present wind direction at other wind turbines near that wind turbine in a wind farm.

The retrofit yaw offset process 700 in some examples receives, at 706, wind speed indications. In some examples, the yaw offset to be used for a particular wind turbine is based on both a present direction of the wind and on wind speeds. In various examples, the yaw offset is determined based on one or more of a present wind speed near the wind turbine such as is determined by the anemometer 444 at that wind turbine, wind speeds at other wind turbines, wind speeds at other locations, or combinations of those. In some examples, the yaw offset value is not based on wind speed but just on the present wind direction at that wind turbine or a combination of present wind directions at this wind turbine and other neighboring wind turbines.

The retrofit yaw offset process 700 in an example determines a yaw offset value, at 708, based on present wind direction at this wind turbine and the present wind direction at neighboring wind turbines. In further examples, where wind speeds at this wind turbine or at this wind turbine are received, the yaw offset value is able to be determined based also on various wind speed values.

The retrofit yaw offset process 700 adds the determined yaw offset value to the wind direction for this turbine, at 710. In an example, this is an adjusted wind direction that is able to be used to drive a conventional yaw controller of a wind turbine that does not implement yaw offsets. This sum of the determined yaw offset value and present wind direction for this turbine is then provided, at 712, to the yaw controller for this wind turbine.

Figure 8:
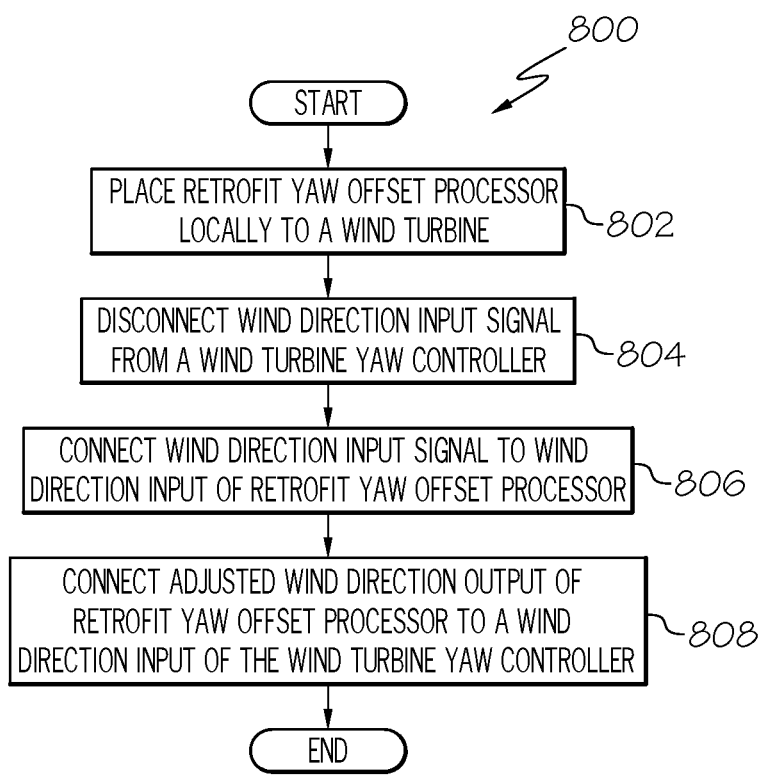
FIG. 8 illustrates a wind turbine retrofit process, according to an example.

FIG. 8 illustrates a wind turbine retrofit process 800, according to an example. The wind turbine retrofit process 800 is an example of a process to retrofit an existing wind turbine with a retrofit yaw offset processor 430. In an example, the wind turbine retrofit process 800 is able to be performed on an operational wind turbine. In an example, the wind turbine retrofit process 800 is able to be performed to incorporate a retrofit yaw offset processor into an operational wind turbine after the wind turbine is made operational.

The wind turbine retrofit process 800 beings by placing, at 802, a retrofit yaw offset processor locally to a wind turbine. In an example, placing the retrofit yaw offset processor locally to a wind turbine includes mounting a retrofit yaw offset processor 430 into the nacelle of the wind turbine or at a location near the nacelle of the wind turbine.

The wind turbine retrofit process 800 includes disconnecting, at 804, a wind direction input signal from the yaw controller of the wind turbine. In an example, this disconnecting includes disconnecting the present direction of wind interface 420 from the wind direction input 416 of the yaw controller 414.

The wind turbine retrofit process 800 includes connecting, at 806, the wind direction input signal to a wind direction input of the retrofit yaw offset processor. In an example, the present direction of wind interface 420 is connected to a present direction of wind input 434 of the retrofit yaw offset processor 430.

The wind turbine retrofit process 800 includes connecting, at 808, an adjusted wind direction signal output of the retrofit yaw offset processor to a wind direction input of the wind turbine yaw controller. In an example, this includes connecting the adjusted wind direction signal output 436 of the retrofit yaw offset processor 430 to the direction of wind direction input 416 of the yaw controller 414. The wind turbine retrofit process 800 then ends.

Figure 9:
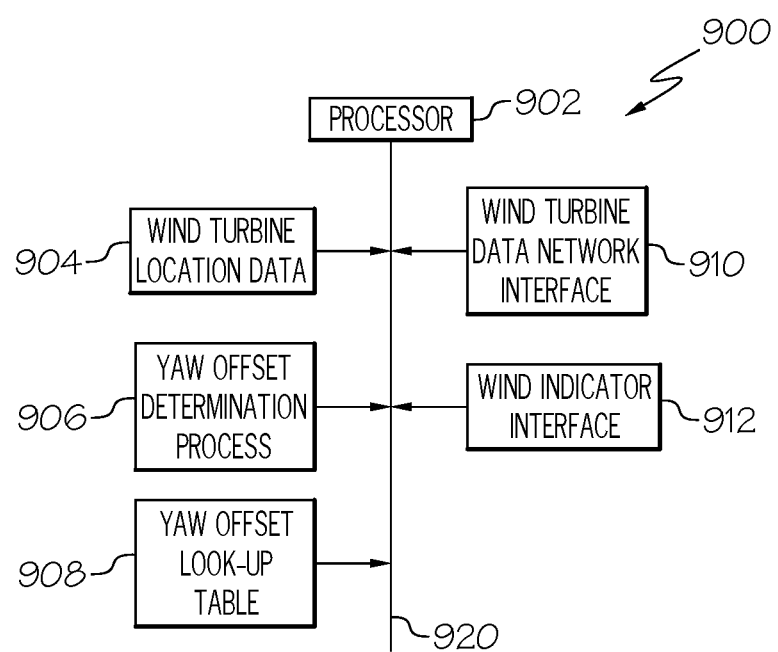
FIG. 9 illustrates a yaw offset controller block diagram, according to an example.

FIG. 9 illustrates a yaw offset controller block diagram 900, according to an example. The yaw offset controller block diagram 900 is an example of components within a yaw offset controller 302 discussed above. The yaw offset controller block diagram 900 depicts components that are able to be within a separate wind turbine farm retrofit yaw offset central controller that is adapted to be incorporated into an operational wind farm. In other examples, the yaw offset controller block diagram 900 depicts components that are able to be in any type of stand alone controller or included in any other type of controller.

The yaw offset controller block diagram 900 includes a processor 902 that is able to access and process data either stored in components of the yaw offset controller block diagram 900, received from other devices, or combinations of these. The processor 902 communicates with other components in the yaw offset controller block diagram 900 via a bus 920.

The yaw offset controller block diagram 900 includes a wind turbine data network interface 910. The wind turbine data network interface 910 in an example is connected to the data communications channel 304 discussed above and allows the processor 902 to exchange data with other devices, such as with controllers in wind turbines, to receive data, send data, or both.

The yaw offset controller block diagram 900 in an example includes a wind indicator interface. The wind indicator interface is used in some examples to allow the processor 902 to receive wind information, such as wind speed, wind direction, or combinations of these, from wind measuring equipment. In an example, the wind indicator interface 912 exchanges data with wind measurement equipment located in a meteorological tower, such as the above described meteorological tower wind vane 324 and meteorological tower anemometer meteorological tower 322.

The yaw offset controller block diagram 900 includes a yaw offset determination process 906. The yaw offset determination process 906 in an example includes program code executed by the processor 902 to calculate yaw offset values to be stored in a yaw offset table that is sent to a particular wind turbine in a wind turbine farm. In an example, a yaw offset table is determined by the processor 902 based on the yaw offset determination process 906 for each wind turbine in a wind farm based on the location of that wind turbine relative to nearby wind turbines. That yaw offset table is then sent to that wind turbine, such as via the data communications channel 304.

The yaw offset controller block diagram 900 includes wind turbine location data 904. The wind turbine location data 904 supports the operation of the yaw offset determination process 906 by providing physical location information for wind turbines in a wind farm. The wind turbine location data 904 is also able to include other information, such as locations and characteristics of other wind obstacles in or near the wind farm. The yaw offset determination process will define one or more algorithms to determine yaw offsets to be applied to a particular wind turbine to reduce the effects of wake created by that wind turbine on other wind turbines that are downstream of that wind turbine. In an example, the yaw offset determination process 906 will determine yaw offsets to use for a particular wind turbine based on the direction of wind at that particular wind turbine based on the location of other nearby wind turbines, obstacles, or combinations of these.

The yaw offset controller block diagram 900 includes a yaw offset look-up table 908 that in an example stores a yaw offset look-up table that is associated with each wind turbine in a wind farm. Each of these yaw offset look-up tables stores yaw offset values for its associated wind turbine. In various examples, the yaw offset look-up table 908 stores yaw offset values that are indexed by one or more of wind direction at the wind turbine, wind speed at the turbine, wind direction at neighboring wind turbines, wind speeds at neighboring wind turbines, or by combinations of these.

In an example, the processor 902 performs the yaw offset determination process 906 to determine and store these yaw offset values for each wind turbine and these determined values are stored in a particular yaw offset look-up table for that wind turbine. These different yaw offset look-up tables in an example are assembled and stored in the yaw offset look-up table 908. The processor 902 in an example then sends to each wind turbine, via the wind turbine data network interface 910, the yaw offset table for that wind turbine.

In a further example, the processor 902 operates by receiving present wind condition information about winds near the wind turbines, and in some examples about present wind conditions at other locations, and based on receiving that present wind condition information, a respective yaw offset value is determined and sent to each wind turbine. A controller at each of these wind turbines receives yaw offset values from the yaw offset controller 302 and applies it to the yaw angle of the wind turbine. In one such example, the yaw offset determination process 906 contains code to cause the processor 902 to access data stored in the yaw offset look-up table 908 and retrieve a respective yaw offset for each turbine based on the received present wind condition information. The yaw offset controller 302 then sends the respective retrieved yaw offset angle to each wind turbine. In various examples, the data in the yaw offset look-up table 908 is generated by the processor 902 based on the yaw offset determination process 906, is stored into the yaw offset look-up table 908 by an external data source, is obtained by any suitable technique, or is obtained by combinations of these techniques. In various examples, the present wind condition information about winds near the wind turbines is able to be received from measurements made local to those wind turbines, is able to be based on wind condition predictions made by any suitable technique or algorithm, may be based on any suitable wind condition determination or estimation technique, or by any combination of these.

Figure 10:
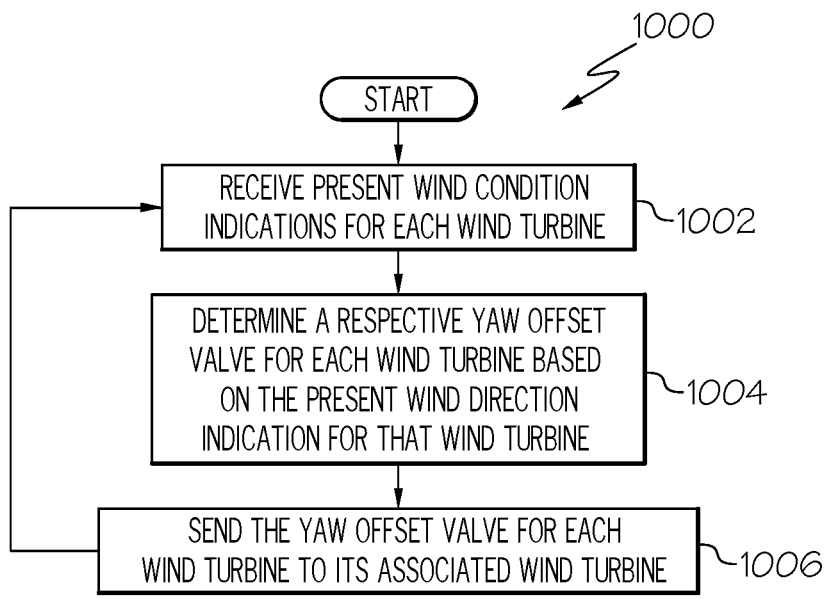
FIG. 10 illustrates a yaw offset control process, according to an example.

FIG. 10 illustrates a yaw offset control process 1000, according to an example. The yaw offset control process 1000 is an example of a process defined by the yaw offset controller 302. The example yaw offset control process 1000 operates to receive wind conditions at wind turbines in a wind farm and then provides yaw offset values to each of those wind turbines based on receiving that present wind condition information in order to minimize adverse effects of wake on downwind wind turbines.

The yaw offset control process 1000 receives, at 1002, present wind condition indications for each wind turbine in a wind farm. In some examples, wind condition indications are able to include indications of one or both of wind direction or wind speed. In further examples, other wind condition information is able to be received. In an example, wind condition indications include wind direction indications that are determined by wind vanes located at each wind turbine. In further examples, wind condition indications further include wind speed indications determined by anemometers located at each wind turbine. These wind condition indications are received in an example via the data communications channel 304.

The yaw offset control process 1000 determines, at 1004, a respective yaw offset value for each wind turbine in the wind farm. In an example, the yaw offset controller 302 stores yaw offset values in association with one or more of different wind directions, different wind speeds, combinations of these, or other values. This determination in such examples includes retrieving from a yaw offset look-up table the yaw offset value that is associated with received present wind condition indications. In further examples, the yaw offset control process 1000 may calculate yaw offset values by processing according to a suitable algorithm that will reduce adverse wake effects on downwind wind turbines. In general, the yaw offset control process 1000 is able to determine respective yaw offset values for each wind turbine by any suitable technique.

The yaw offset control process 1000 sends, at 1006, the yaw offset value for each wind turbine to its associated wind turbine. In an example, this yaw offset value is sent as a yaw offset signal via the data communications channel 304. The yaw offset control process 1000 then returns to receive, at 1002, present wind condition indications for each wind turbine in the wind farm.

Figure 11:
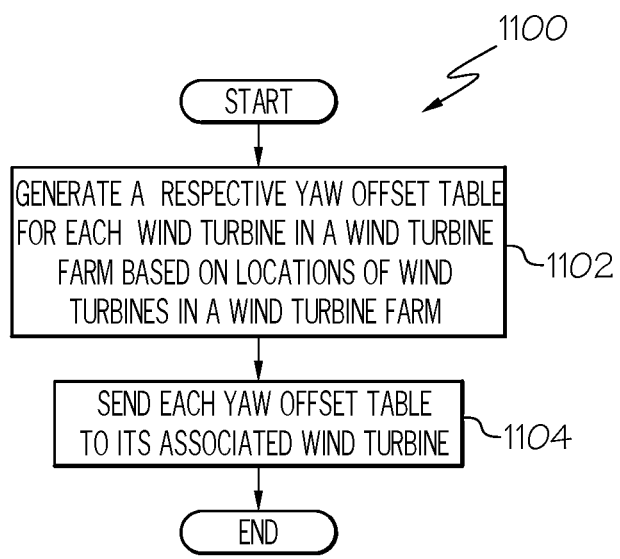
FIG. 11 illustrates a yaw offset table generation process, according to an example.

FIG. 11 illustrates a yaw offset table generation process 1100, according to an example. The yaw offset control process 1000 is an example of a process defined by the yaw offset determination process 906 within a yaw offset controller 302. The yaw offset table generation process 1100 defined by the yaw offset determination process 906 in an example includes program code executed by the processor 902 to calculate yaw offset values to be stored in a yaw offset table that is sent to a particular wind turbine in a wind turbine farm. In an example, a yaw offset table for a particular wind turbine is generated by the yaw offset table generation process 1100 based on the location of that wind turbine relative to nearby wind turbines.

The yaw offset table generation process 1100 generates, at 1102, a respective yaw offset table for each wind turbine in a wind farm. The values of yaw offsets stored in a yaw offset table for a particular wind turbine is based on locations of wind turbines within the wind farm. In an example, the yaw offset controller 302 determines yaw offset values in association with one or more of different wind directions, different wind speeds, combinations of these, or other values. These yaw offset values for a particular wind turbine are then stored in a yaw offset table that is associated with that particular wind turbine. This determination in some examples includes executing an algorithm that determines the effect of wake on downwind wind turbines for different wind conditions and determines a yaw angle value that will reduce the effect of the wake for the particular wind conditions such as wind direction, wind speed, or both.

The yaw offset table generation process 1100 then sends, at 1104, each yaw offset table to its associated wind turbine. In an example, these yaw offset tables are sent to a controller in each wind turbine via the data communications channel 304. In an example, the yaw offset table is sent to a retrofit yaw offset processor 430 installed in each wind turbine. The yaw offset table generation process then ends.

Figure 12:
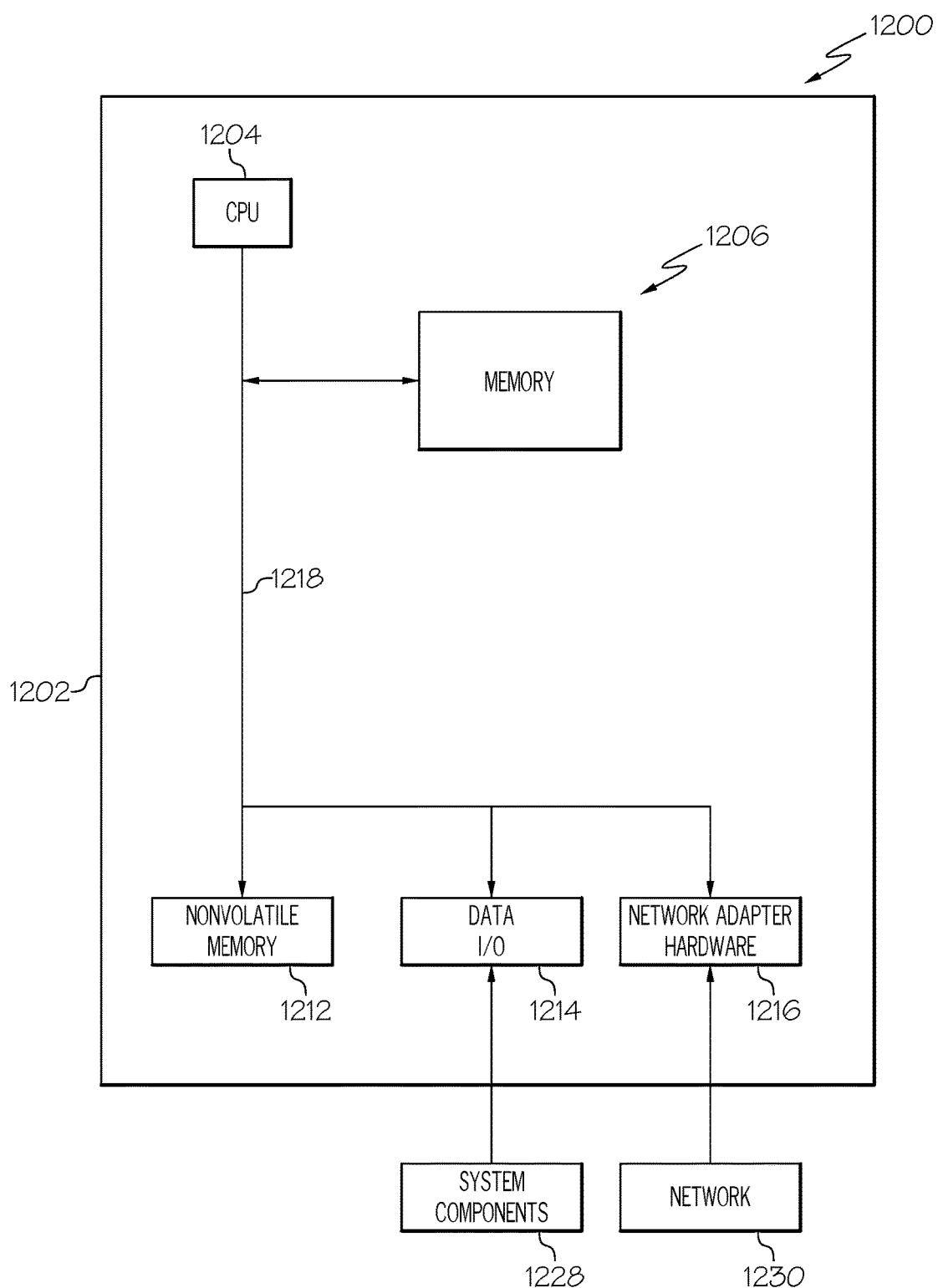
FIG. 12 illustrates a block diagram illustrating a controller, according to an example.

FIG. 12 illustrates a block diagram illustrating a controller 1200 according to an example. The controller 1200 is an example of a processing subsystem that is able to perform any of the above described processing operations, control operations, other operations, or combinations of these.

The controller 1200 in this example includes a CPU 1204 that is communicatively connected to a main memory 1206 (e.g., volatile memory), a non-volatile memory 1212 to support processing operations. The CPU is further communicatively coupled to a network adapter hardware 1216 to support input and output communications with external computing systems such as through the illustrated network 1230.

The controller 1200 further includes a data input/output (I/O) processor 1214 that is able to be adapted to communicate with any type of equipment, such as the illustrated system components 1228. The data input/output (I/O) processor in various examples is able to be configured to support any type of data communications connections including present day analog and/or digital techniques or via a future communications mechanism. A system bus 1218 interconnects these system components.

In other examples, yaw offset may be based not only on wind direction, but also air temperature, air humidity and other atmospheric affects.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for retrofitting a wind turbine to receive control of yaw offsets of the wind turbine, the method comprising:
    placing a retrofit yaw offset processor locally to a wind turbine;
    disconnecting a wind direction input signal from a wind direction input of a wind turbine yaw controller;
    connecting the wind direction input signal to a wind direction input electrical connector of the retrofit yaw offset processor;
    connecting an adjusted wind direction output electrical connector of the retrofit yaw offset processor to the wind direction input of the wind turbine yaw controller;
    receiving, at the wind direction input electrical connector of the retrofit yaw offset processor, a present wind direction signal indicating a present direction of wind at a wind turbine;
    producing an adjusted wind direction signal comprising a sum of the present wind direction signal and a yaw offset signal; and
    providing, through the adjusted wind direction output electrical connector of the retrofit yaw offset processor, the adjusted wind direction signal to a yaw control input of the wind turbine,
    wherein the yaw control input of the wind turbine, when receiving the present wind direction signal in an absence of the yaw offset signal, causes a yaw controller to align the wind turbine with the present direction of wind.

2. The method of claim 1, further comprising receiving the yaw offset signal from a remote data source.

3. The method of claim 2, further comprising providing the present wind direction signal to the remote data source.

4. The method of claim 1 further comprising receiving a second present wind direction signal from a second wind turbine operating within a vicinity of the wind turbine, and
    wherein producing the adjusted wind direction signal is further based on the second present wind direction signal.

5. The method of claim 1, further comprising:
    storing a yaw offset table comprising a plurality of yaw offset values, each yaw offset value in the plurality of yaw offset values being associated with a respective wind direction; and
    determining the yaw offset signal based on a yaw offset value stored in the yaw offset table in association with a present wind direction indicated by the present wind direction signal.

6. The method of claim 5, further comprising receiving a second present wind direction signal from a second wind turbine operating within a vicinity of the wind turbine, and
    wherein determining the yaw offset signal is further based on the second present wind direction signal.

7. The method of claim 5, further comprising:
    receiving, from a remote source, at least one yaw offset value; and
    storing the at least one yaw offset value into the yaw offset table.

8. The method of claim 1,
    wherein the wind turbine is operational without the retrofit yaw offset processor, and
    wherein the retrofit yaw offset processor is incorporated into the wind turbine after the wind turbine is made operational.

9. The method according to claim 1, wherein the retrofit yaw offset processor is installed local to the wind turbine and includes a yaw offset table comprising a plurality of yaw offset values, each yaw offset value in the plurality of yaw offset values being associated with a respective wind direction.

10. The method according to claim 1, wherein the retrofit yaw offset processor is installed local to the wind turbine and includes a yaw offset table comprising a plurality of yaw offset values, each yaw offset value in the plurality of yaw offset values being associated with a respective wind direction and a second respective wind direction, and the method further comprising:
    receiving, at the retrofit yaw offset processor from a remote wind direction sensor operating within a vicinity of the wind turbine, a second present wind direction signal indicating a second present wind direction, and
    wherein determining the yaw offset signal is based on a yaw offset value stored in the yaw offset table in association with the present direction of wind and the second present wind direction.

11. The method according to claim 10, wherein the remote wind direction sensor is local to a second wind turbine operating within the vicinity of the wind turbine.

12. The method according to claim 10, wherein the remote wind direction sensor is local to a meteorological tower operating within the vicinity of the wind turbine.

13. A retrofit yaw offset controller system, comprising:
    a retrofit assembly adapted to be incorporated into an operational wind farm, the retrofit assembly comprising:
        a yaw offset processor configured to determine a plurality of yaw offset values, the plurality of yaw offset values comprising at least one respective yaw offset value that is associated with a respective wind turbine within a plurality of wind turbines within a wind turbine farm, wherein each wind turbine in the plurality of wind turbines comprises a respective retrofit yaw processor that has been retrofitted into existing wind turbines within the plurality of wind turbines; and
        a wind turbine data network interface configured to be connected to a data communications channel within the wind turbine farm, the wind turbine data network interface and the data communications channel configured to communicate with the respective retrofit yaw processor in each wind turbine in the plurality of wind turbines, and
        the wind turbine data network interface being further configured to send each respective yaw offset value to a respective retrofit yaw processor that has been retrofitted into its associated wind turbine.

14. The retrofit yaw offset controller system of claim 13, wherein the yaw offset processor is further configured to determine a plurality of yaw offset tables, each respective yaw offset table in the plurality of yaw offset tables being associated with a respective wind turbine in the plurality of wind turbines and each yaw offset table comprising a plurality of yaw offset values for the respective wind turbine, each yaw offset value being associated with a wind direction, and wherein the wind turbine data network interface is further configured to send each respective yaw offset table to the respective retrofit yaw processor that has been retrofitted into its associated wind turbine.

15. The retrofit yaw offset controller system of claim 13, wherein the wind turbine data network interface is further configured to receive a present wind speed indication associated with a wind turbine within the plurality of wind turbines, wherein the yaw offset processor is further configured to determine the respective yaw offset value associated with each respective wind turbine based further on the present wind speed indication, and wherein the respective yaw offset value is a present respective yaw offset value to be applied to its associated wind turbine.

16. The retrofit yaw offset controller system of claim 15, wherein the present wind speed indication comprises at least one of a present wind speed measurement and a wind speed prediction.

17. The retrofit yaw offset controller system of claim 15, wherein the wind turbine data network interface is further configured to receive a plurality of wind direction indications, the plurality of wind direction indications comprising a respective present wind direction indication from a respective wind direction sensor associated with each respective wind turbine within the plurality of wind turbines, wherein the yaw offset processor is further configured to determine for each respective wind turbine within the plurality of wind turbines, based on the plurality of wind direction indications, a respective present yaw offset value associated with the respective wind turbine, and wherein the wind turbine data network interface sends the respective present yaw offset value to the respective retrofit yaw processor that has been retrofitted into its associated respective wind turbine.

18. The retrofit yaw offset controller system of claim 17, wherein the plurality of wind direction indications comprises at least one of a wind direction measurement and a wind turbine direction indication.

19. The retrofit yaw offset controller system of claim 17, wherein the wind turbine data network interface is further configured to receive a plurality of wind speed measurements comprising a respective present wind speed measurement from a respective wind speed sensor associated with each respective wind turbine within the plurality of wind turbines, and wherein the yaw offset processor is further configured to determine the respective present yaw offset value associated with the respective wind turbine based further on the respective present wind speed measurement received form the respective wind speed sensor associated with the respective wind turbine.

20. The retrofit yaw offset controller system of claim 13, further comprising the respective retrofit yaw processor in at least one wind turbine in the plurality of wind turbines, wherein each respective retrofit yaw processor comprises:

a respective retrofit module configured to be installed in a respective operational wind turbine;

a respective wind direction input electrical connector physically coupled to the respective retrofit module;

a respective adjusted wind direction output electrical connector physically coupled to the respective retrofit module;

a respective input electrically coupled to the respective wind direction input electrical connector and configured to receive a respective present wind direction signal from a respective wind direction sensor that is local to the respective operational wind turbine, the respective wind direction sensor determining a respective present wind direction; and a respective output coupled to a respective present wind direction input of a respective yaw controller of the respective operational wind turbine through the respective adjusted wind direction output electrical connector, the respective yaw controller responding to signals on the respective present wind direction input by turning the yaw of the respective operational wind turbine based on a respective signal on the respective present wind direction input, wherein the respective output configured to provide an adjusted wind direction signal to the respective present wind direction input of the respective yaw controller based upon the respective present wind direction signal and a respective yaw offset signal.

21. A retrofit processor configured to be installed in an operational wind turbine, the retrofit processor comprising:

a retrofit module configured to be installed in an operational wind turbine;

a wind direction input electrical connector physically coupled to the retrofit module;

an adjusted wind direction output electrical connector physically coupled to the retrofit module;

a first input electrically coupled to the wind direction input electrical connector and configured to receive a present wind direction signal from a wind direction sensor that is local to the operational wind turbine, the wind direction sensor determining a present wind direction; and an output coupled to a present wind direction input of a yaw controller through the adjusted wind direction output electrical connector, the yaw controller responding to signals on the present wind direction input by aligning the operational wind turbine in a substantially perpendicular direction with the present wind direction indicated by a signal on the present wind direction input, wherein the output provides an adjusted wind direction signal to the present wind direction input of the yaw controller based upon the present wind direction signal and a yaw offset signal.

22. The retrofit processor according to claim 21, further comprising an interface configured to:

communicate an indication of the present wind direction to a remote processor; and receive the yaw offset signal.

23. The retrofit processor according to claim 21, further comprising an integral yaw offset table having a plurality of yaw offset values, wherein the yaw offset signal is determined based upon the present wind direction signal and a value in the yaw offset table.

24. The retrofit processor according to claim 23, wherein the operational wind turbine is within a wind farm system comprising a second wind turbine operating within a vicinity of the operational wind turbine, the second wind turbine having been retrofitted with a second retrofit processor comprising a second integral yaw offset table,
- wherein the second integral yaw offset table includes at least one respective yaw offset value stored in association with a respective wind direction, the at least one respective yaw offset value being different from a yaw offset value of the yaw offset table that is associated with the respective wind direction.

25. The retrofit processor according to claim 21, wherein the retrofit processor is installed local to the operational wind turbine, and
- wherein the retrofit processor further comprises a yaw offset table comprising a plurality of yaw offset values, each yaw offset value in the plurality of yaw offset values being associated with a respective wind direction and a second respective wind direction, and wherein the retrofit processor is configured to:
  - receive from a remote wind direction sensor operating within a vicinity of the operational wind turbine, a second present wind direction signal indicating the second respective present wind direction, and
  - determine the yaw offset signal is based on a yaw offset value stored in the yaw offset table in association with the present wind direction and the second respective present wind direction.

26. The retrofit processor according to claim 25, wherein the remote wind direction sensor is local to a second wind turbine operating within the vicinity of the operational wind turbine.

27. The retrofit processor according to claim 25, wherein the remote wind direction sensor is local to a meteorological tower operating within the vicinity of the operational wind turbine.

* * * * *